March 1, 1949.   R. W. STOLZENBACH   2,462,919

METHOD OF CORONA MEASUREMENTS

Filed Aug. 23, 1944

INVENTOR.
ROBERT W. STOLZENBACH

BY William D. Hall.
ATTORNEY

Patented Mar. 1, 1949

2,462,919

UNITED STATES PATENT OFFICE 2,462,919

METHOD OF CORONA MEASUREMENT

Robert W. Stolzenbach, Springfield, Ohio

Application August 23, 1944, Serial No. 550,819

3 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to electrical circuits and particularly bridge circuits, which has for an object the measurement of corona in coaxial cables.

Another object is to provide a polarizing means for corona measurement wherein the cable to be tested is an integral part of the bridge circuit and wherein the shield acts as an anode and the center conductor as a cathode.

A further object is to eliminate extraneous corona indications by ancillary devices and conduits in such a bridge circuit.

A further object is to provide a system of corona measurement in electric cables which is simple in character, easy to manipulate and adjust, and necessitating few and standardized parts.

These and other objects will appear throughout the specifications and will be pointed out in the claims.

Corona, or the leakage of voltage across coaxial conductors, has become a serious problem to the proper functioning of electronic circuits. Due to the fact that the corona point varies in different portions of a cable because of variation in density or quality of insulation or in the gauge of the conductor itself, a manufacturer's corona rating of a cable cannot be universally accepted. For universal acceptance the margin of safety must be much greater than necessary, with a consequent increase in cost, weight and size. By testing the samples to be used, much smaller margins of safety would be feasible and would be highly desirable in airborne equipment.

The present invention utilizes a set of four identical pieces of the cables to be tested by arranging them in a bridge circuit; that is, the cable samples are paired and looped and their inner and outer conductor elements are connected so that an outer and an inner conductor of each pair is electrically connected to the opposite leads of the secondary of a high voltage A. C. transformer, and then joined to each other in bridge form by a shunt-connected neon glow lamp or an oscilloscope. Glowing of the lamp or indication lines on the oscilloscope will reveal corona leakage between the inner and outer conductors in the cable.

Figure 1:
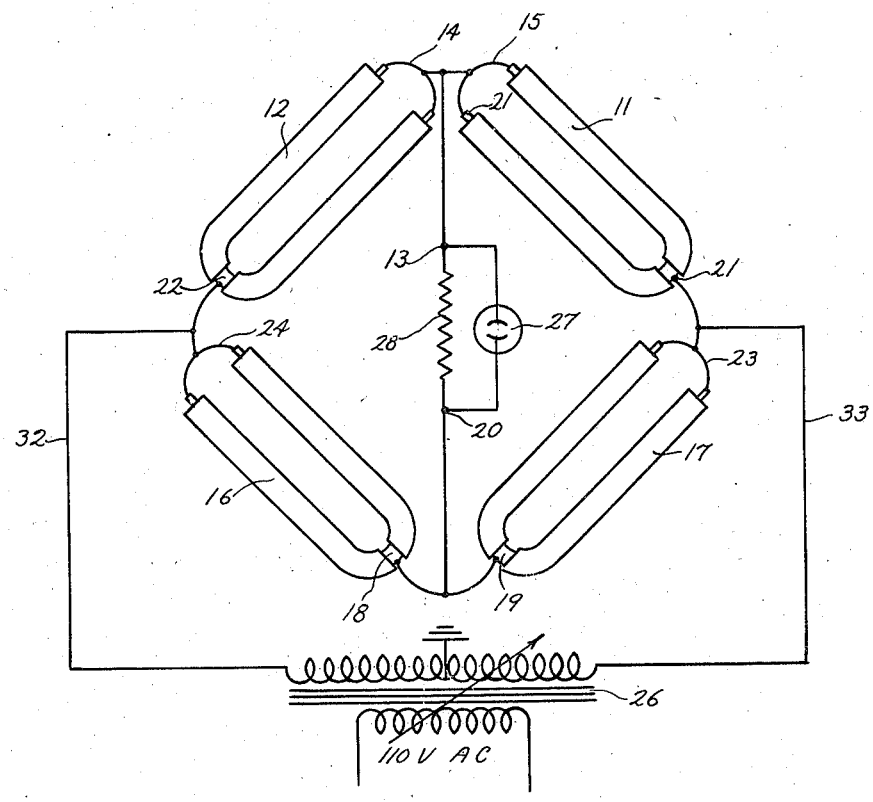
Figure 1 is a schematic diagram showing the interconnecting arrangement of cables, source of voltage and the neon glow tube.
Figure 2:
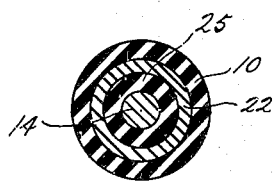
Figure 2 is a lateral cross-sectional view of a coaxial cable illustrating the inter-relation of the two insulated conductors.

Referring to drawings wherein like numerals denote like parts, and by way of illustration, the bridge circuit is composed of four substantially identical closed loops of coaxial cable, such as is used in high frequency electronic circuits. Loops 11 and 12 form a common terminal connection 13 joining their respective center core conductors 14 and 15. Loops 16 and 17 have their respective outer tubular conductors or "shields" 18 and 19 electrically joined to form a common terminal connection 20. It is to be noted that only the core conductors 14, 15, 23 and 24 of the cables are joined to form closed loops. The shield conductors 18, 19, 21 and 22 in all four loops 11, 12, 16 and 17 form electrical connection by means of clamps which penetrate through the outer insulation or "skin" of the cable. Thus, it is obvious that there is no direct electrical connection between the closed loop center conductors and the outer shield conductors. Any current from the transformer 26 that passes from common connector 13 of the core loops to common connector 20 of the shield loops or vice versa must penetrate the core insulation 25. This penetration of current will occur when the voltage impressed on the bridge circuit through the transformer is sufficiently high. To facilitate indication and measurement of this corona or current leak-through, a neon glow tube 27 is shunted across a resistance element 28 in series circuit between the two common connectors 13 and 20.

Figures 4, 5:
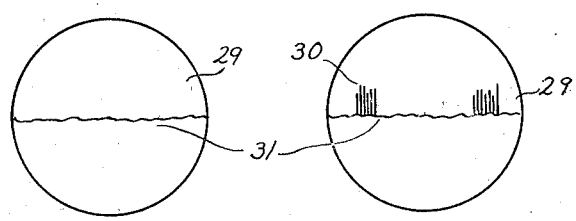
Figure 4 is a schematic view of an oscilloscope dial illustrating the location of the reference line.
Figure 5 is a similar view to that shown in Figure 4, wherein corona indication lines are illustrated above the reference line of the oscilloscope.
Figure 3:
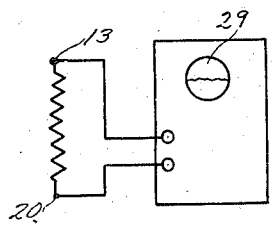
Figure 3 is a partial schematic diagram illustrating the mode of connecting an oscilloscope into the circuit of Figure 1 in place of the neon glow lamp.

In place of a neon glow tube 27, which indicates the corona voltage point, there may be substituted a cathode ray tube oscilloscope 29, as shown in Figure 3. It has been found that the circuit described produces a corona pattern, shown in Figure 5, indicating that the alternating current in the circuit has been rectified since the lines 30, representing the corona leakage, are all above the reference line 31 of the oscilloscope screen.

It has been further noted when using a glow tube instead of the oscilloscope, that only the negative terminal of the neon tube glows, thereby also indicating rectification of the A. C. corona current.

In operation, the loops are connected as described and the secondary coil leads of a variable high voltage A. C. transformer are alternately connected to the conductors of the loops so that one lead 32, connects with the shield conductor 22 of loop 12 and the center conductor 24 of loop 16, while the other lead 33 of the transformer secondary coil is connected with the shield conductor 21 of loop 11 and center conductor 23 of loop 17.

On one alternation of the A. C. current, if the voltage is sufficiently high, corona current will flow from lead 32, through center conductor 24, across insulation 25 to shield conductor 18, through terminal 20, neon tube 27, center conductor 15, insulation 25 and shield conductor 21 of loop 11 and then to transformer lead 33. On the reverse cycle current will flow from transformer lead 33 through center conductor 23, insulation 25 and shield conductor 19 of loop 17; then through terminal 26, neon tube 27, common connector 13, center conductor 14, insulation 25, and shield connector 22 of loop 12 to lead 32 of the transformer.

It is thus apparent that during each alternation current passes through tube 27 in the same direction and accounts for glowing of the negative terminal only and unilateral line indications on the oscilloscope screen.

The resistor 28 may be in the region of 25,000 ohms when used with 110 volts alternating current, although this is not a critical element, and may vary with the size and type of cable being tested and the voltage applied.

In use, the voltage applied through the transformer is gradually raised until a glow in the neon tube appears or, if the oscilloscope is used, until vertical lines appear in relation to the reference line. By observing the voltage applied when corona appears, the corona limit of the cables is established and the cables, when removed from this simple test apparatus, can be immediately put to use.

In the determination of the actual corona voltage point for each of the cable samples, the total voltage across the secondary of transformer 26 is divided by two, because the samples are connected in series. In other words, if corona appears when the voltage of the secondary of transformer 26 is 10,000 volts, then the corona point of each of the samples is recorded as 5000 volts.

While the invention has been shown and described in its preferred embodiment, it is contemplated that changes in the details thereof may be made within the spirit and scope of the invention as claimed.

Having thus described the invention, what is claimed is:

1. The method of measuring the corona voltage point in coaxial cable comprising: electrically connecting four substantially identical portions of the cable to be tested at four points, the first between the center elements of a first pair of said portions, the second between the outer elements of a second pair of said portions, the third and fourth each between an inner element of the first pair and an outer element of the second pair of said portions, impressing a variable alternating voltage across said third and fourth points, increasing such voltage until just sufficient to cause a voltage across said first and second points, whereat the impressed voltage is indicative of the corona voltage point.

2. A combination for testing the corona voltage point of coaxial electric cable comprising: four equal segments of the coaxial cable to be tested, each having a center and an outer element, said equal segments connected in a bridge circuit with four terminal points, a first between the center elements of a first pair of said segments, a second point between the outer elements of the second pair of said segments, a third point and a fourth point each between an outer element of the first pair of said segments and a center element of the second pair of said segments, a variable alternating voltage across the third and fourth of said points sufficient to cause corona, and a voltage indicating device across a resistance terminated at the first and second of said points indicating the presence of corona.

3. A combination as defined in claim 2 including four substantially identical loops of the lengths of coaxial cable to be tested as segments, said loops being so arranged that their respective center conductors form closed loops and their outer shield conductors form open loops.

ROBERT W. STOLZENBACH.

REFERENCES CITED

The following references are of record in the file of this patent:

UNITED STATES PATENTS

| Number | Name | Date |
|---|---|---|
| Re. 14,816 | Tschudy | Mar. 9, 1920 |
| 1,253,211 | Chubb | Jan. 15, 1918 |
| 1,565,613 | Anderegg | Dec. 15, 1925 |
| 1,688,932 | Lockrow | Oct. 23, 1928 |
| 1,747,050 | Charlton | Feb. 11, 1930 |
| 2,008,545 | Dobke et al. | July 16, 1935 |
| 2,098,275 | Cassen | Nov. 9, 1937 |
| 2,290,559 | Hitchcock et al. | July 21, 1942 |
| 2,344,344 | Dorsman et al. | Mar. 14, 1944 |

FOREIGN PATENTS

| Number | Country | Date |
|---|---|---|
| 420,657 | France | Nov. 30, 1910 |